(12) United States Patent
Kuwata

(10) Patent No.: US 6,274,019 B1
(45) Date of Patent: Aug. 14, 2001

(54) ELECTRODEIONIZATION APPARATUS

(75) Inventor: Masahiro Kuwata, Tokyo (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 09/521,364

(22) Filed: Mar. 8, 2000

(51) Int. Cl.$^7$ ............................................. B01D 61/46
(52) U.S. Cl. ..................... 204/632; 204/519; 204/525
(58) Field of Search ................... 204/519, 525, 204/632, 628

(56) References Cited

U.S. PATENT DOCUMENTS 6,056,878 * 5/2000 Tessier et al. ..................... 210/639

FOREIGN PATENT DOCUMENTS

| | | |
|---|---|---|
| 1-107809 | * 4/1989 | (JP) . |
| 9-24374 | 1/1997 | (JP) . |
| 11-239792 | * 9/1999 | (JP) . |

* cited by examiner

Primary Examiner—Kathryn Gorgos
Assistant Examiner—Thomas H Parsons
(74) Attorney, Agent, or Firm—Rosenthal & Osha L.L.P.

(57) ABSTRACT

Water to be treated (feed water) flows through a series of desalination chambers filled with ion exchange resins on which impurity ions in the feed water are removed. Each desalination chamber consists of a cation-permeable membrane on one side with an anion-permeable membrane on the other side. The space between the two membranes is filled with the ion exchange resins and there are concentrate chambers on either side of the membranes. There is a cathode chamber or an anode chamber each located at either end of the assembly of alternating desalination and concentrate chambers. By circulating the concentrate water while adding acid to the concentrate water to maintain its acidity, scale deposition within the concentrating chambers and the electrode chamber is prevented so that deionizing capability of the entire assembly can be maintained.

9 Claims, 2 Drawing Sheets

ELECTRODEIONIZATION APPARATUS

BACKGROUND OF THE INVENTION

1. Field of the Invention

The present invention relates to an improved electrodeionization apparatus capable of preventing scale deposition of hardness components.

2. Description of the Related Art

Ion exchange resins have been used to produce deionized water. These ion exchange resins generally require chemical regeneration. To avoid this, a deionizing function of the ion exchange resins and an electrodialysis function of ion exchange membranes are combined in an electrodeionization (EDI) apparatus to obtain high-purity deionized water without chemical regeneration.

A typical EDI apparatus comprises a series of desalination chambers each having a cation exchange membrane on one side, and an anion exchange membrane on the other side. The space between the two membranes is filled with cation and anion exchange resins. Concentrate chambers are provided on both sides of each desalination chamber in which concentrate water flows. Water to be treated is passed through the desalination chambers while a direct current is applied to the desalination chambers across the ion exchange membranes. As a result, impurity ions are electrically moved from the water to be treated, via ion exchange resins, to the concentrate water flowing in the concentrate chambers outside of the ion exchange membranes. Thereby, deionized water is produced in the desalination chambers and impurity ions are concentrated in the concentrate water.

The concentrate water is once discharged from the apparatus, but is not discarded. More specifically, the concentrate water is reused to improve the water utilization rate (recovery rate) of the EDI apparatus. That is, the concentrate water discharged from the EDI apparatus is returned to the inlet side of the concentrate chamber, while the water to be treated is supplied to the EDI apparatus. A portion of the circulating concentrate water is discharged out from the apparatus. By circulating and reusing the concentrate water in this manner, the water utilization rate is improved and a reasonable ion concentration in the concentrated water is maintained. By employing this circulating method of concentrate water, the ion concentration within the concentrate water increases and this in turn leads to higher electrical conductivity of the concentrate water. Thus, electricity flows more freely and the electrical current flow in the apparatus increases. Because of this increase in the current flow, the ion removal rate increases. Another advantage of such an apparatus is a decrease in power consumption because the applied voltage can be made smaller.

On the other hand, hardness components such as Ca and Mg, which originally exist in the concentrate water in small amounts, become increasingly concentrated as the concentrate water is circulated and reused, and, over time, more rapidly deposit in the concentrate chambers or in the electrode chambers to form scales. When scales are formed in the concentrating chambers or in the electrode chambers, the electrical resistance at the area where the scales are formed increases and less electric current flows at that section. For the same amount of current to flow as when no scales exist, the applied voltage must be increased and, therefore, power consumption must be increased. When still more scales are formed, the voltage must further be increased, eventually to the point where the applied voltage exceeds the maximum voltage of the device, at which point the current begins to decrease. In this case, sufficient current for ion removal cannot be applied, and the quality of the treated water deteriorates.

Some methods employed to prevent hardness components from concentrating in the concentrate water include (a) applying a softening treatment to the water to be treated by a reverse osmosis membrane apparatus which acts as a pretreatment apparatus for the EDI apparatus, (b) applying a softening treatment to the permeate water from the reverse osmosis membrane apparatus (the water to be treated by the EDI apparatus) which acts as a pretreatment apparatus for the EDI apparatus, and (c) increasing the amount of the concentrate water to be discarded from the EDI apparatus.

However, methods (a) and (b) above require providing a water softening apparatus and handling of regeneration chemicals and increase the cost and complexity of the facility. Method (c) above is undesirable in that the water usage rate (recovery rate) of the apparatus decreases when the concentration of hardness components in the water to be treated is relatively high.

SUMMARY OF THE INVENTION

One objective of the present invention is to prevent scale deposition of the hardness components at the concentrate chambers or at the electrode chambers to maintain the deionizing capability of the EDI apparatus.

Research by the inventor of the present invention shows that, in general, the pH value of the water to be treated by the EDI apparatus falls within a range 5 and 7 while the pH value of the concentrate water falls within a range between 4 and 8. In this pH range, the hardness components concentrated in the concentrate water have poor solubility and therefore, scales tend to accumulate. The inventor's research also shows that, by bringing the pH value of the water to be treated to the acidic side, the solubility of the hardness components can be enhanced and the scale formation can be prevented.

According to the present invention, an acidic solution is added to the concentrate water in the EDI apparatus and the acidity of the concentrate water is maintained.

Hence, the solubility of the hardness components such as Ca and Mg within the concentrate water increases. Because of this increase in solubility, formation of scales, such as calcium carbonate scales, in the concentrating chambers, for that matter, or in the electrode chambers can be prevented, even when the concentrate water is highly concentrated. Therefore, in the apparatus according to the present invention, a decrease in performance due to an increase in electrical resistance caused by formation of scales can be prevented. Moreover, because it is possible to use highly concentrated water, the water utilization rate of the apparatus can be improved, the applied voltage can be decreased, and the power consumption can be reduced.

By supplying the acidic concentrate water to the electrode chambers, formation of scales at the electrode chambers can also be prevented.

DESCRIPTION OF PREFERRED EMBODIMENT

An EDI apparatus according to the preferred embodiment of the present invention is described in the following with reference to the figures.

Figure 1:
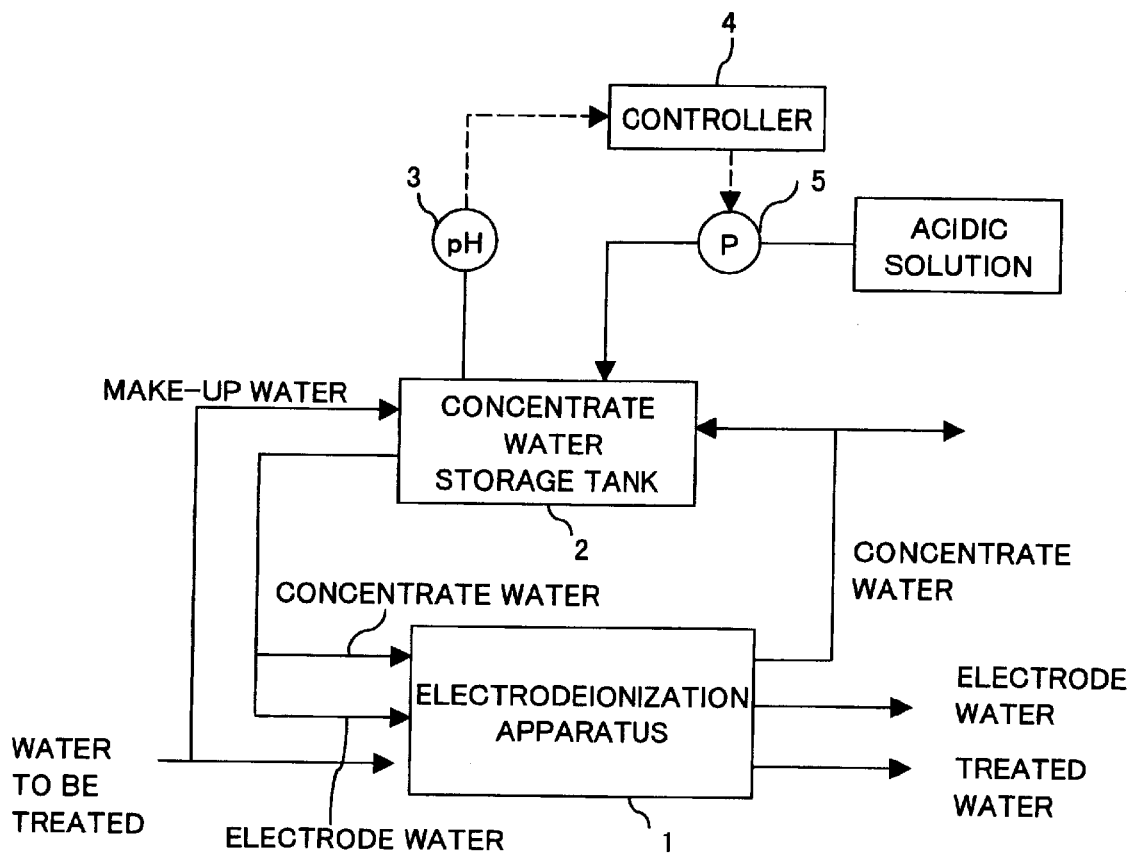
FIG. 1 is a block diagram showing the structure of an EDI apparatus according to the present invention.

FIG. 1 is a block diagram showing the structure of an EDI apparatus according to the preferred embodiment of the present invention. The water to be treated is fed to an EDI (electrodeionization) apparatus 1. The EDI apparatus 1 includes a series of desalination chambers filled with ion exchangers such as ion exchange resins and ion exchange fibers, a concentrate chambers separated from the desalination chambers by ion exchange membranes, and a pair of electrodes for applying voltage to the desalination and the concentrating chambers. Water to be treated is fed to the desalination chambers and the concentrate water is sent to the concentrating chambers in order to transfer salts to the concentrate water flowing into the concentrating chambers through the ion exchange membranes. In this manner, treated water with salts removed (deionized water) can be obtained while concentrate water containing concentrated salts can be obtained at the concentrating chambers. The treated water is discharged from the desalination chambers and the concentrate water is discharged from the concentrating chambers. The concentrate water is also circulated to the electrode chambers where the electrodes are provided (electrode water). Therefore, electrode water is discharged from the electrode chambers.

Figure 2:
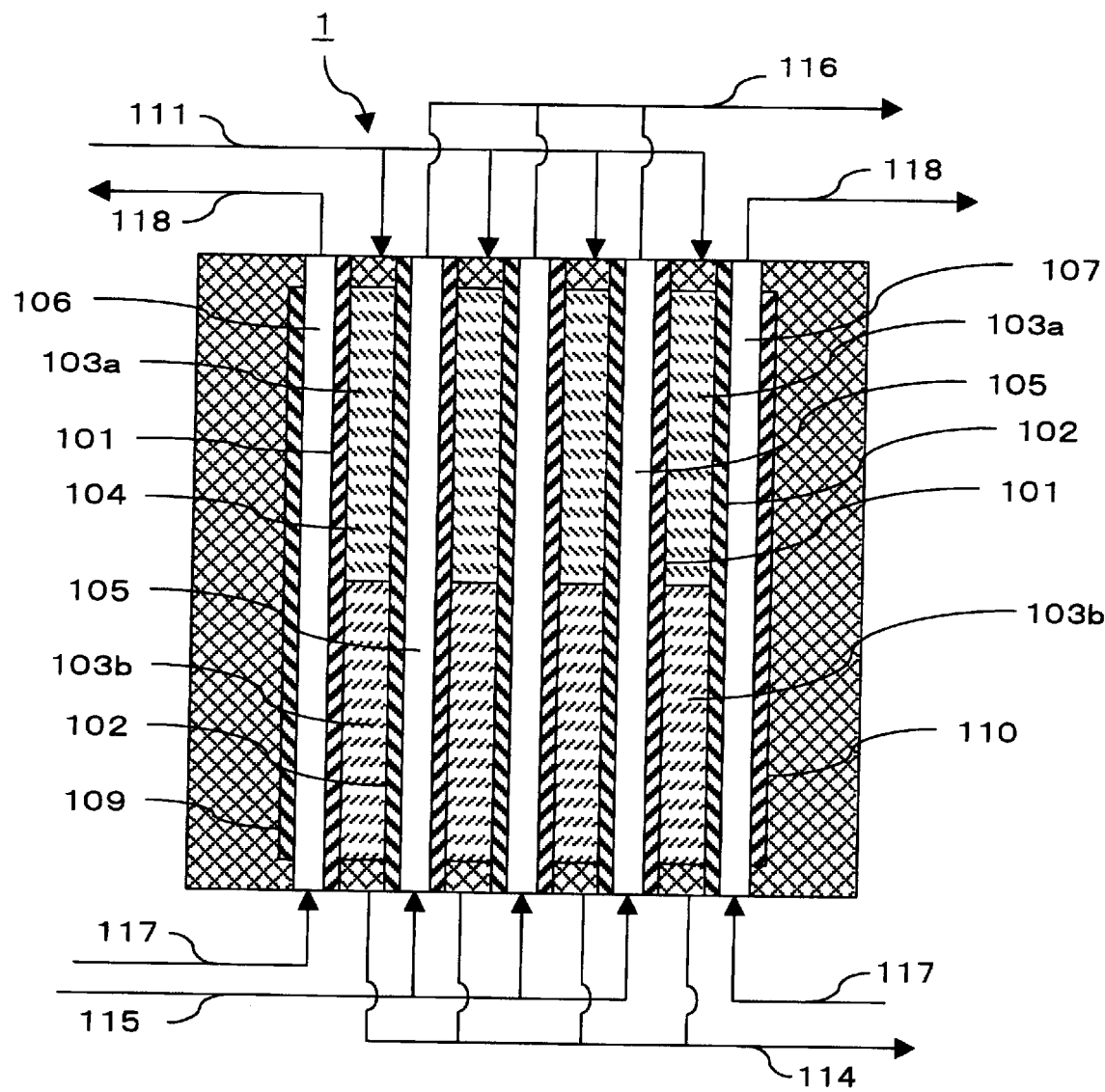
FIG. 2 shows the inner structure of an EDI apparatus according to the present invention.

FIG. 2 shows a structure of an EDI apparatus 1 according to the present invention. In this apparatus, cation exchange membrane 101 and anion exchange membrane 102 are provided alternately with space in between. Ion exchangers 103 fill every other space formed between the alternating cation 101 and anion exchange membrane 102 to form desalination chambers 104.

Anion exchange resin 103a fills one side of the desalination chamber 104 where the water to be treated is fed and a mixed ion exchange resin 103b of cation and anion exchange resins fills the other side of the desalination chamber 104 where the treated water is discharged.

The chambers, formed by the anion exchange membranes 102 and the cation exchange membranes 101 which separate the desalination chambers 104 from each other, which are not filled with ion exchangers form concentrate chambers 105 where concentrate water flows.

A plurality of desalination chambers 104 and a plurality of concentrate chambers 105 are alternately formed with the outermost chambers on both sides being the concentrate chambers 105. Therefore, the number of concentrating chambers 105 is one more than the number of desalination chambers 104. An anode chamber 107 is provided in one of the outermost concentrate chamber 105 opposing an anion exchange membrane 102 and a cathode chamber 106 is provided in the other outermost concentrating chamber 105 opposing a cation exchange membrane 101. An anode 110 is provided in the anode chamber 107 and a cathode 109 is provided in the cathode chamber 106.

Water to be treated (feed water) is supplied from feed water supply line 111 to the desalination chambers 104 and treated water is passed through the desalination chambers 104 and discharged from treated water discharge line 114. Concentrate water is supplied from concentrate water supply line 115 to the concentrate chambers 105 and the concentrate water which has passed through the concentrating chambers 105 is discharged from concentrate water discharge line 116. A portion of the concentrate water discharged from the concentrate chambers 105 is supplied to the cathode chamber 106 and anode chamber 107 through electrode water supply pipes 117 and is discharged through electrode water discharge pipes 118.

By passing the water to be treated through the desalination chambers 104 while applying a direct current between the cathode 109 and the anode 110 to apply a constant electric field to the desalination chambers 104, ions are removed from the water to be treated in the desalination chambers 104, and treated water (desalinated) can be obtained at the treated water discharge pipe 114.

On the other hand, a portion of the water to be treated (make-up water) and all of the concentrate water discharged from the concentrate chamber 105 of the EDI apparatus 1 are sent to a concentrate water storage tank 2. An acidic solution is also supplied to the concentrated water storage tank 2 by a separate pipe. The concentrate water stored in the concentrate water storage tank 2 and adjusted to be acidic is supplied to the concentrating chambers 105 and to the electrode chambers 106 and 107 (electrode water) of the EDI apparatus 1.

In the preferred embodiment of the present invention, because an acidic solution is supplied to the concentrate water storage tank 2, the pH of the concentrate water is adjusted to the acidic side and then recirculated. The solubility of the hardness components such as Ca and Mg in the concentrate water is enhanced. Thus, formation of scales such as calcium carbonate in the concentrate chamber or, for that matter, in the electrode chamber can be prevented even when the concentrate water is highly concentrated. Because of this, decrease in performance of the EDI apparatus 1 caused by increase of the electric resistance due to scale formation can be prevented. Moreover, because highly concentrated water can be used, the water utilization rate of the EDI apparatus 1 can be improved while applied voltage can be decreased, resulting in reduced power consumption.

The pH value of the concentrate water within the concentrate water storage tank 2 is measured by a pH meter 3 and the measured result is fed to a controller 4. The controller 4 controls an acidic solution supply pump 5 so that the pH value within the concentrate water storage tank 2 may fall within a predetermined range (for example, between 2 and 4). In this manner, the pH value of the concentrate water supplied to the concentrate chambers and the electrode water supplied to the electrode chambers of the EDI apparatus 1 can be controlled and maintained to fall within a predetermined range.

In FIG. 2, each member is drawn to different scales in order to facilitate the understanding of the figure. For example, the ion exchange membranes 101 and 102 are drawn to have a much wider width.

The water to be treated can be any water including, but not limited to, city water, permeate water which is reverse osmosis membrane treated industrial water, and rinse waste water resulting from rinsing semiconductor wafers with high-purity water. In the case of the RO permeate water, the amount of hardness components such as Ca and Mg included in the permeate water varies depending on the concentration of hardness components in the feed water and the bivalence ion removal capability of the reverse osmosis membrane apparatus, but is within a range between 0.01 to 2 mg/L. The apparatus of the present invention is particularly effective for treating water containing a large concentration of hardness components.

The acidic solution to be added to the concentrate water storage tank 2 can be prepared by use of any acid including, but not limited to, sulfuric acid and hydrochloric acid. Of these, sulfuric acid is preferable. The use of hydrochloric acid is undesirable because when hydrochloric acid is used, concentration of chloride ions in the concentrate water increases and, since a portion of the concentrate water is supplied to the electrode chambers, hypochlorous acid and chlorine gas could be generated by electrolysis in the electrode chambers, which in turn could damage the ion exchange membranes or the ion exchange resins.

The acidic solution can be added to the concentrate water at any stage including, but not limited to, injection to the concentrate water line pipes and injection to the concentrated water storage tank which stores the concentrate water. The method of injection for the acidic solution to the concentrate water can be any continuous or intermittent addition methods. The pH value of the concentrate water adjusted by the method of the present invention is preferably within a range between 2 and 4. When the pH value is too low such as a pH value of less than 2, the acid may cause pumps and pipes to corrode, and, when the pH value is higher than 4, the efficiency of preventing scale formation is lowered. When intermittent addition methods are employed to inject the acidic solution, the pH value should preferably be maintained between 2 and 2.5 in order to dissolve scales formed when the acidic solution is not added.

In the present embodiment, because the apparatus is configured so that the controller 4 controls the acidic solution supply pump 5 according to the measured value of the pH meter 3, control of the pH value of the concentrate water and of the electrode water to be supplied to the EDI apparatus to a desired value is ensured.

Moreover, because there is a correlation between the pH value and electric conductivity of the concentrate water, the apparatus can be configured to predetermine this correlation and control the acidic solution supply pump according to the reading of an electric conductivity meter instead of the pH meter 3. This configuration (the use of an electric conductivity meter) has an advantage that the control is stabilized and, because an electric conductivity meter is relatively inexpensive, the overall cost of the apparatus can be reduced.

It may also be preferable to omit independent controller 4 and to produce outputs that are dependent on the maximum and minimum values of the electric conductivity in the electrical conductivity meter. In this configuration, when the electrical conductivity falls outside the range defined by the maximum and minimum values, a signal is directly sent to the acidic solution supply pump 5 so that the pump is controlled to stop when the electrical conductivity exceeds the maximum value and the pump is controlled to be driven when the electrical conductivity becomes less than the minimum value. By using this configuration, the pH can be controlled with a very simple control. A similar control using the maximum and minimum values can also be employed when using the pH meter 3.

The following is one example of the correlation between the pH and electric conductivity when sulfuric acid is added to the concentrate water storage tank 2.

| pH | Electrical conductivity |
|---|---|
| 3.0 | 1000 µS/cm |
| 3.5 | 400 µS/cm |
| 4.0 | 200 µS/cm |

EXAMPLES

The present invention is described further citing examples.

Example 1

An EDI apparatus having the following specifications and the configuration shown in FIG. 1 were used in a 20 day treatment experiment. The water to be treated was prepared by first passing water from a city water faucet through an activated carbon absorption column, then treating the resulting water by a reverse osmosis membrane apparatus, and mixing calcium carbonate solution so that Ca concentration of the RO permeate water was adjusted to 0.2 mg/L. A sulfuric acid solution was used as the acidic solution, and was added to the concentrate water storage tank 2 so that the pH value of the concentrate water in the concentrate water storage tank 2 was adjusted to fall within a range of 2 to 2.5 while the EDI apparatus was in operation. The results were evaluated by measuring the electrical conductivity of the treated water and observing any scale deposits within the concentrating chambers and the electrode chambers after 20 days. The results are shown in Table 1.

(EDI apparatus)
Treated water flow rate: 3.0 m$^3$/h
Concentrate water flow rate: 0.5 m$^3$/h
Electrode water flow rate: 0.1 m$^3$/h
Applied voltage: 200V
Ion Exchangers
Cation exchange resin: AMBERLITE IR-120B
Anion exchange resin: AMBERLITE IRA-400 (both manufactured by Rohm and Haas Co.)
Ratio of the cation exchange resin to the anion exchange resin in volume: 1:2
Ion Exchange Membranes
Cation exchange membrane CMH and anion exchange membrane AMH (both manufactured by Tokuyama Soda Manufacturing Co.)

Comparative Example 1

The apparatus shown in FIG. 2 was used to follow a method similar to the method of Example 1, with the exception that the acidic solution was not injected. The results are shown in Table 1.

TABLE 1

| | Example 1 | Comparative Example 1 |
|---|---|---|
| Electric conductivity of the water to be treated (µS/cm) | 5.0 | 5.0 |
| ph value of the concentrate water | 2.0~2.5 | 6.2~6.8 |
| Resistivity of the treated water at the beginning of operation (MΩ · cm) | 16 | 16 |
| Resistivity of the treated water after 20 days (MΩ · cm) | 16 | 7 |
| Conditions within the concentrate and electrode chambers | No scale deposition observed | Some scale deposition observed and a part of the flow line is blocked |

From Table 1, it can be seen that no scale deposition nor deterioration of quality of the treated water was observed in Example 1. White scales observed in the concentrate chambers and in the electrode chambers of the comparative example 1 were analyzed and as a result of the analysis, they were found to be calcium carbonate. As can be seen, when such scales of calcium carbonate are formed in the concentrating chambers, the electric resistance of that area increases and current flow is impeded. It then becomes more difficult to desorb the impurities ions absorbed to the ion exchangers and, as a result, the deionization capability of the EDI apparatus is reduced.

Effect of the Invention

In the present invention, an acidic solution is added to the concentrate water and the pH of the concentrate water is maintained at the acidic side while the concentrate water is being circulated and reused. Because of this configuration, the solubility of the hardness components such as Ca and Mg in the concentrate water is enhanced. Thus, formation of scales such as calcium carbonate within the concentrate chambers and/or within electrode chambers can be prevented, even when the concentrate water is highly concentrated. As a result, performance deterioration caused by increase in the electric resistance due to formation of scales can be prevented. Moreover, because highly concentrated water can be used, the water utilization rate of the apparatus can be raised while applied voltage is decreased, and the power consumption can be reduced.

What is claimed is:

1. An electrodeionization apparatus for electrically removing ions from water to be treated, comprising a series of desalination chambers through which an electric field is applied for removing ions from flowing water to be treated, concentrate chambers provided adjacent to said desalination chambers through ion exchange membranes for concentrating ions which have been removed from said water to be treated to flowing concentrate water, and an acidic solution feeding apparatus for adding an acidic solution to said concentrate water to be supplied to said concentrate chambers.

2. An apparatus of claim 1, wherein, said desalination chambers are filled with ion exchange resins.

3. An apparatus of claim 1, wherein, said concentrate chambers are provided on both sides of said desalination chambers with an anode and a cathode provided on the outside of said concentrating chambers, and said ion exchange membrane forming a boundary on one side between said concentrate chamber and said desalination chamber is a cation exchange membrane and said ion exchange membrane forming a boundary on the other side between said concentrating chamber and said desalination chamber is an anion exchange membrane.

4. An apparatus of claim 3, wherein, said anode is provided within an anode chamber, said cathode is provided within a cathode chamber, and a portion of said concentrate water added with said acidic solution is supplied to said anode chamber and cathode chamber as electrode water.

5. An apparatus of claim 1, wherein, said acidic solution contains sulfuric acid.

6. An apparatus of claim 1, wherein, said concentrate water added with said acidic solution has a pH value within a range between 2 and 4.

7. An apparatus of claim 1 further comprising a pH meter for measuring pH of said concentrate water to be supplied to said concentrate chambers, and said electrode chambers wherein the amount of said acidic solution added to said concentrate water is controlled based on pH values measured by said pH meter.

8. An apparatus of claim 1 further comprising an electric conductivity meter for measuring the electric conductivity of said concentrate water to be supplied to said concentrating chambers and said electrode chambers, wherein the amount of said acidic solution added is based on the reading of said electric conductivity meter.

9. An apparatus of claim 8, wherein, addition of said acidic solution is halted when the measured value of said electric conductivity meter exceeds a maximum value, and addition of said acidic solution is begun when the measured value of said electric conductivity meter is lower than a minimum value.

* * * * *